C. W. BLAKE.
RESILIENT TIRE.
APPLICATION FILED JUNE 25, 1910.
1,008,110.
Patented Nov. 7, 1911.
3 SHEETS—SHEET 1.
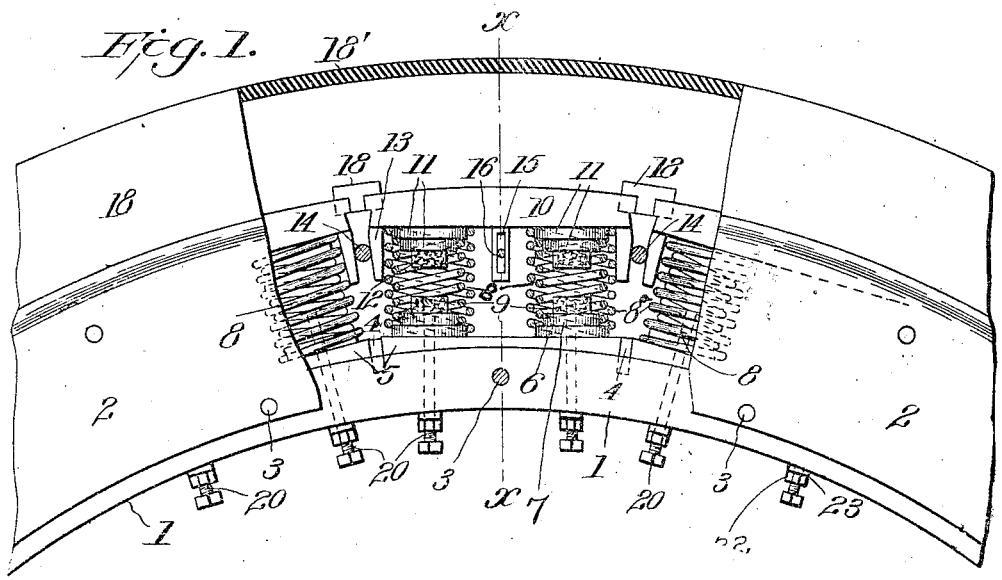
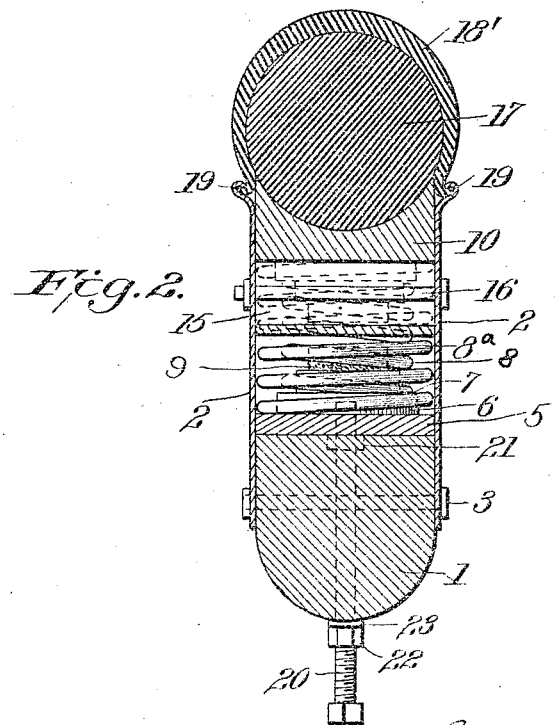
Witnesses
Inventor
Charles W. Blake,
By Edson Bros,
Attorneys

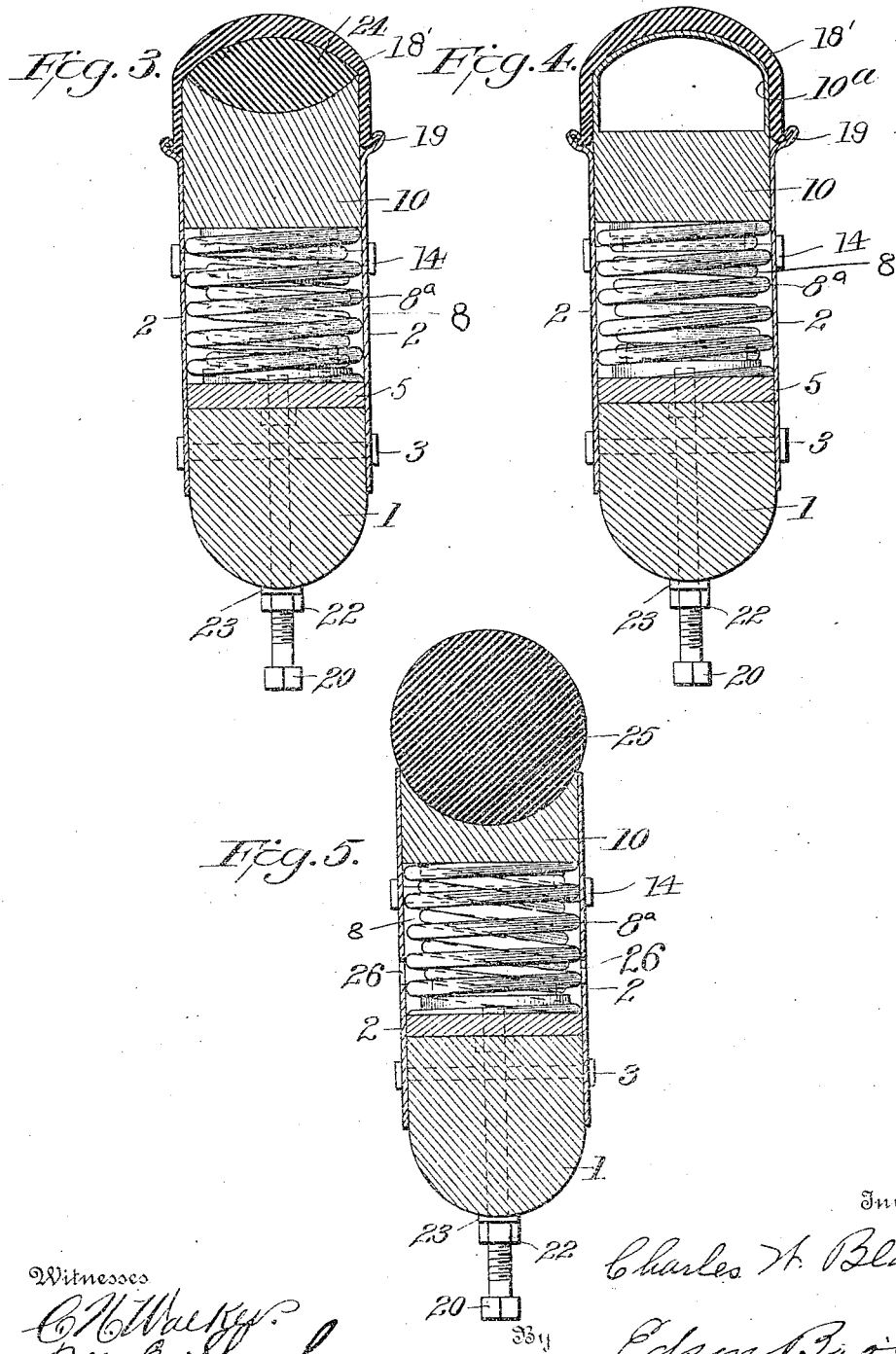

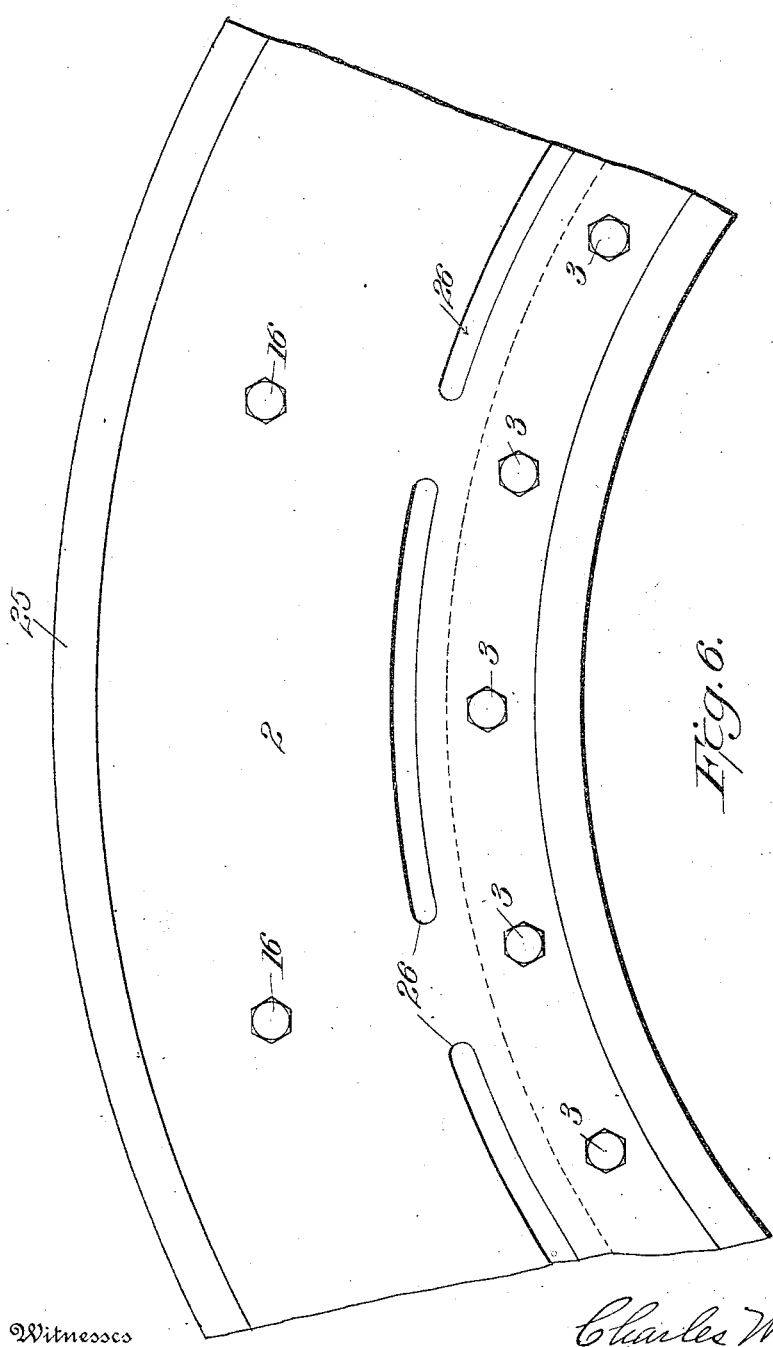

UNITED STATES PATENT OFFICE.

CHARLES W. BLAKE, OF DELAWARE CITY, DELAWARE.

RESILIENT TIRE.

1,008,110. Specification of Letters Patent. Patented Nov. 7, 1911.

Application filed June 25, 1910. Serial No. 568,901.

*To all whom it may concern:*

Be it known that I, CHARLES W. BLAKE, a citizen of the United States, residing at Delaware City, in the county of Newcastle and State of Delaware, have invented certain new and useful Improvements in Resilient Tires; and I do hereby declare the following to be a full, clear, and exact description of the invention, such as will enable others skilled in the art to which it appertains to make and use the same.

My invention relates to vehicle tires.

It has for its object to provide a resilient tire which is entirely puncture proof and, therefore, much more durable than the ordinary pneumatic tire.

Another object is to provide for varying the tension or resiliency of the tire to accord with the weight of the load.

Further objects will become apparent from the following description.

The invention consists in the features of construction and combinations of parts hereinafter described and specified in the claims.

In the accompanying drawings, illustrating the preferred embodiments of my invention: Figure 1 is a side view of a part of a wheel carrying one of my tires, a portion of the tire and felly of the wheel being shown in central section. Fig. 2 is a cross section on the line $x$—$x$ of Fig. 1. Fig. 3 is a similar view of a modified construction in which a smaller inner tire is used. Fig. 4 is a similar view of a modified construction in which no inner tire is used. Fig. 5 is a similar view of a modified construction in which no outer tire is used, and Fig. 6 is a broken side view of the last modification.

Referring first to Figs. 1 and 2 of the drawing, 1 designates the felly of the wheel which has outwardly extending flanges 2 secured to it by any suitable means, such as the bolts 3. Between these flanges and arranged crosswise on the outer surface of the felly are lugs 4 spaced equidistant apart and serving as guides for plates or shoes 5 which conform on their inner faces to the felly but are flat on their outer surfaces. Outwardly extending tables 6 are formed on each of the shoes 5. Said tables are stepped, as at 7, to provide for centering and retaining helical springs 8 arranged interiorly of larger similar springs 8ª. The springs of each pair are coiled in opposite directions whereby the force of said springs is directed in true radial lines. A bumper 9 of rubber or other suitable flexible material is fixed in a socket in the outer face of each table, or otherwise secured thereto. Said bumper in reality constitutes one of the concentric circular steps of the table, and it extends into the spring 8.

An outer shoe 10 having tables 11 and bumpers 12, similar to those on the shoes 5, is arranged above each of said shoes 5. Said bumpers 12 and 9 are adapted to be brought together when the springs are compressed. Each shoe 10 has a flat under surface and a curved outer surface conforming to the curvature of the wheel. Said shoe 10 is equipped with inwardly extending lugs 13 which are guided between the shanks of bolts 14 passed transversely through the flanges 2 at points arranged radially above the lugs 4 on the felly. The shoe 10 is further guided and retained against endwise movement by a slotted lug 15 arranged at the middle of said shoe and engaging a bolt 16 also passed transversely through the flanges 2.

The shoes 10 are grooved on their outer faces to receive a solid tire 17. Plates 18 are let into the under surface of said tire and span the spaces between the adjacent ends of the shoes 10 whereby the tire is prevented from entering between said shoes and the unrestricted action of the latter is insured. An outer tire or covering 18[1] is placed over the tire 17 and is secured by the turned clencher-form edges 19 of the flanges 2.

In order to adjust or vary the tension or resiliency of the tire to accord with the weight of the load, I provide bolts 20 passed through the felly with their heads projecting outwardly therefrom and their other extremities engaging sockets in the inner faces of the shoes 5. A nut 21 is set in the outer surface of the felly around each bolt, the latter having screw-thread connection with said nut whereby the bolt may be extended or withdrawn, by applying a wrench to its head, with the result that the shoe 5 is moved outwardly or inwardly thereby compressing or expanding the springs 8. Each bolt is preferably provided with a lock nut 22, which engages a washer 23 interposed between it and the inside of the felly, for the purpose of preventing the bolts from working loose by reason of the jars incident to the running of a vehicle mounted on wheels provided with my improved tire.

As illustrated in Fig. 3, a small flattened inner tire 24 may be employed instead of the round tire 17, shown in Fig. 2. In Fig. 4, the outer shoe 10ª is made in skeleton form, to secure lightness, and no inner tire is used. It will be noted that the outer shoes in all of these constructions are capable of moving in and out between the flanges 2, and are cushioned by the springs 8 so that jars are absorbed by my tire in the same manner as the ordinary pneumatic tire, and even to a greater degree. At the same time, it is perfectly puncture proof because there are no pneumatic tires employed. As illustrated in Figs. 5 and 6, the outer tire may be dispensed with and a single tire 25 used. Such a construction, however, will not be dust proof, so I provide slots 26 in the flanges 2 for the discharge of dust or water which may enter between them. These slots are not formed in the flanges when an outer tube is used because the tire is then thoroughly dust and water proof.

I do not limit myself to the exact details of construction herein shown and described as they may be changed without departing from the spirit or sacrificing the advantages of my invention. For instance, any other resilient material may be employed instead of the springs. When springs are used, the number and thickness thereof may be varied to suit the load. I, therefore, reserve the right to make such changes as fairly fall within the scope of the appended claims. It may be noted that the tires may be fastened to the shoes in any suitable manner.

I claim:

1. The combination, with a felly of a wheel, and tire, of shoes on the inner surface of the tire, other shoes on the outer surface of the felly, tables on the facing surfaces of said inner and outer shoes, said tables having concentric circular steps thereon, helical springs interposed between said shoes and engaging the steps on said tables, bumpers arranged concentrically of the steps of said tables farthest from their respective shoes, said bumpers being made of resilient material and extending within said springs where they are adapted to be brought together when said springs are compressed.

2. The combination, with the felly of a wheel, and a tire, of adjustable shoes on the outer surface of the felly, other shoes on the inner surface of the tire, springs interposed between said shoes, radial lugs on the felly to guide the inner shoes, flanges secured to said felly and extending outwardly to the sides of the tire, and bolts arranged transversely through both flanges in radial alinement with said lugs and between the adjacent ends of the outer shoes for guiding the latter.

3. The combination, with a felly of a wheel, and a tire, of adjustable shoes on the outer surface of the felly, other shoes on the inner surface of the tire, springs interposed between said shoes, radial lugs on the felly to guide the inner shoes, flanges secured to said felly and extending outwardly to the sides of the tire, bolts arranged transversely through the flanges in radial alinement with said lugs and between the adjacent ends of the outer shoes for guiding the latter, and plates conforming to the outer surfaces of said outer shoes and to the inner surface of the tire and arranged between them so as to span the spaces between said shoes for the purpose specified.

In testimony whereof, I affix my signature, in presence of two witnesses.

CHARLES W. BLAKE.

Witnesses:
C. EARL BAUM,
G. A. CLARK.